Sept. 29, 1931.  E. A. LINK, JR  1,825,462
COMBINATION TRAINING DEVICE FOR STUDENT
AVIATORS AND ENTERTAINMENT APPARATUS
Filed March 12, 1930  4 Sheets-Sheet 1

INVENTOR
EDWIN A. LINK. JR.
BY
ATTORNEY

Sept. 29, 1931.  E. A. LINK, JR  1,825,462
COMBINATION TRAINING DEVICE FOR STUDENT
AVIATORS AND ENTERTAINMENT APPARATUS
Filed March 12, 1930   4 Sheets-Sheet 3

INVENTOR
EDWIN A. LINK JR.
BY
ATTORNEY

Sept. 29, 1931.  E. A. LINK, JR  1,825,462
COMBINATION TRAINING DEVICE FOR STUDENT
AVIATORS AND ENTERTAINMENT APPARATUS
Filed March 12, 1930     4 Sheets-Sheet 4

INVENTOR
EDWIN A. LINK JR.
BY
ATTORNEY

Patented Sept. 29, 1931

1,825,462

UNITED STATES PATENT OFFICE

EDWIN A. LINK, JR., OF BINGHAMTON, NEW YORK

COMBINATION TRAINING DEVICE FOR STUDENT AVIATORS AND ENTERTAINMENT APPARATUS

Application filed March 12, 1930. Serial No. 435,151.

My invention relates to a combination training device for student aviators and entertainment apparatus, and has for its purpose many objects which will be first briefly indicated and then more fully explained and described.

One of the primary objects of my invention is to provide an apparatus for the training of student aviators and by means of which the student is subjected to all the natural sensations of flying and at the same time the apparatus is placed under his control to an extent which permits him to operate the device exactly as an airplane is operated, whereby he is able to learn easily and with perfect safety to himself the various operations which must be performed in order to correct the tilts, dips, swings, roll and other movements of the device, and thus acquire the proper and necessary operating knowledge which will enable him to keep an airplane on an even keel or respond to the necessary manipulation of rudder, elevators and ailerons.

Another object of my invention is to provide an apparatus of this character with a dummy rudder, elevators and ailerons, all under the control of the operation stick, whereby the student may see the actual operation of these parts as the position of the "plane" is corrected or manipulated.

Still another object lies in the provision of means for visually indicating to the student any improper position of the "plane."

Still another object of my invention is to provide an automatically operated recording device for scoring or recording the number of errors which the student makes while operating the device.

A further and important object lies in the provision of means in the form of fluid control, and operable by the control stick in the device for moving the apparatus to all of the normal positions which an airplane may assume in flight, and for correcting such positions, that is, bringing the "plane" to an even keel.

Another object of my invention lies in the provision of means for automatically causing the "plane" to assume varying positions out of normal, coupled with the controlling means which will enable the student to overcome such automatic deflecting means and correct the position of the "plane" brought about, or tended to be brought about thereby.

Still another object of my invention lies in the provision of means whereby this device may be operated as an entertainment apparatus for profit, by including in the control circuit thereof a coin actuated means for permitting the operation thereof.

It will be readily understood that in the training of student pilots, it is a prime requisite that one of the first things to be learned is the operation of the control stick by means of which the position of the airplane can be changed at will and by means of which any position of the plane out of normal can be quickly corrected. It has been my purpose in this invention to provide an apparatus simulating almost exactly every actual condition which a flier encounters in actual flight and by means of which the student can learn in complete absence of danger to himself or the apparatus, how to meet and/or create such conditions. The invention therefore, is of great value as a means of instruction for student pilots and in addition because of its safety, affords an interesting and unique entertainment device.

Many other objects and advantages in details of construction and operation will be apparent as the description proceeds, reference now being had to the figures of the drawings forming a part of this application and wherein like reference numerals indicate like parts.

In order that my device will simulate as closely as possible the actual conditions which a pilot will encounter in actual flight, I have constructed the device in the form of a miniature airplane sufficiently large to accommodate one person therein. It will be understood, of course, that the device may be built on a larger scale if desired, and of course the type of airplane may be any desired as my invention is readily adaptable to any type.

Figures 1, 2, 3:
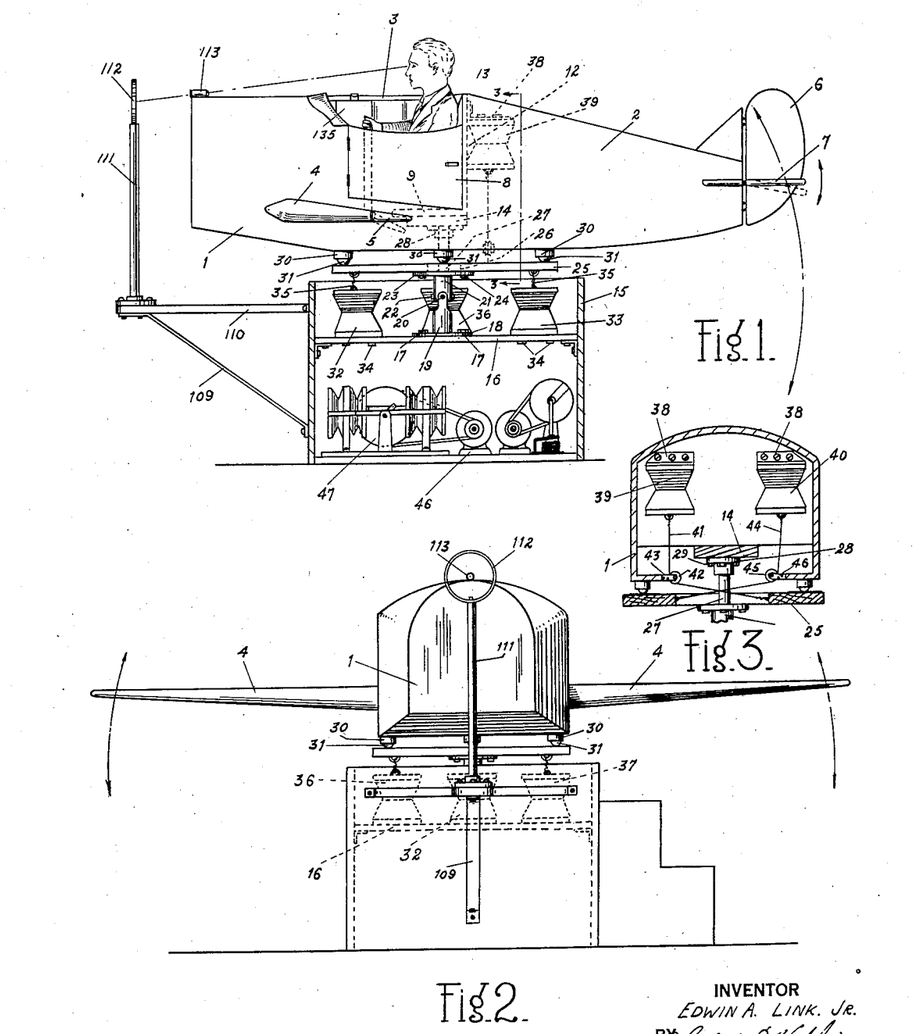
Figure 1 is a side view of my apparatus, partly in section.
Figure 2 is a front view thereof.
Figure 3 is a detail sectional view taken on the line 3—3 of Figure 1.
Figure 4:
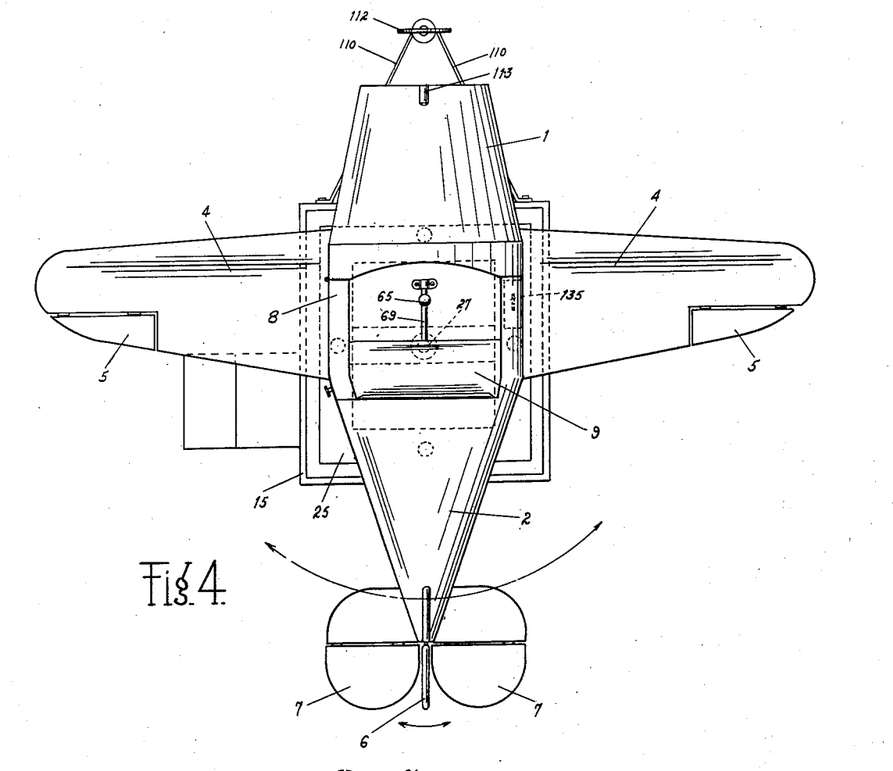
Figure 4 is a top plan view of the appratus.
Figures 6, 7, 8:
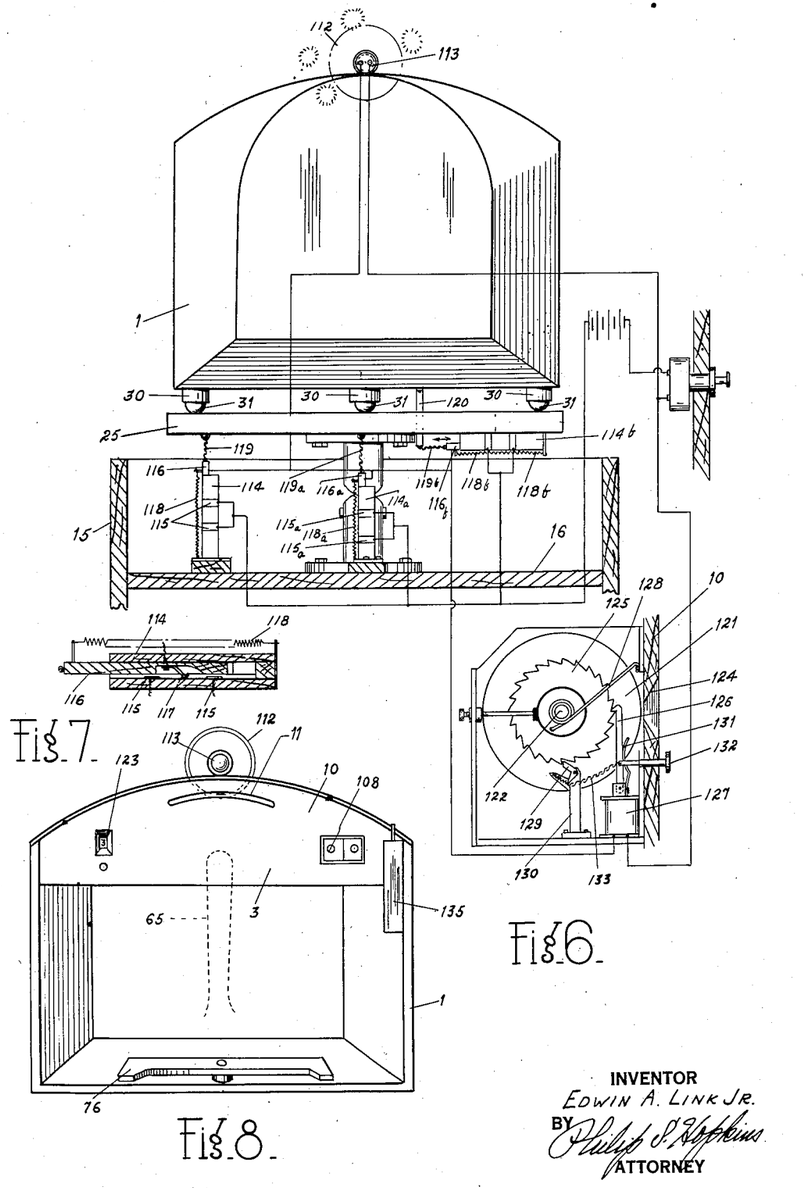
Figure 6 is a detail view partly in section and partly diagrammatic illustrating certain parts of my invention.
Figure 7 is a detail sectional view illustrating one of the electric contacts used in my invention.
Figure 8 is a detail view illustrating the cock pit of my apparatus.

In the form herein illustrated, the "plane" is indicated generally by the reference character 1 and is provided with the usual tail 2, cock pit 3, wings 4, ailerons 5, rudder 6 and elevators 7. A door 8 provides access to the cock pit 3 within which is provided a seat 9 in which the student or other operator sits. The cock pit 3 may be provided with a dash board 10 upon which may be mounted any desired instruments, some of which will be hereafter described in detail and which if desired, may include a bank-indicator 11 and any other devices or instruments normally positioned on the dash board of an airplane.

Secured to the back of the seat 9 is a bracket 12 fastened as by means of bolts or screws 13 and provide at its lower end with an angular extension 14 positioned beneath the seat 9 and suitably secured thereto.

Supporting means are provided for the "plane" to hold it above the floor or ground and this supporting means comprises a box-like frame structure 15 provided with a shelf or bracket 16 therein to the upper side of which is secured as by bolts 17 a plate 18 extending upwardly from which is a spindle 19 provided at its upper end with a pintle 20 upon which is pivoted a second spindle 21 provided with the pintle 22. The spindles 19 and 21 and pivot pintles 20 and 22 provide a universal pivot means permitting any structure supported by the upper spindle 21 to rock forwardly and backwardly and to either side, as will be clearly understood.

The upper spindle 21 is provided with a flanged plate 23 secured to which as by bolts 24 is a platform 25. This platform 25 is provided centrally with an opening 26 through which extends the reduced upper end 27 of the spindle 21 on the upper end of which is rotatably journaled the collar 28 secured as by bolts 29 to the bracket member 14. Thus the plane 1 by virtue of this bracket 14 of the collar 28 is rotatably mounted upon the spindle 21. Obviously also by virtue of this support upon the spindle 21 the "plane" is subject to the pivotal movements of such spindle both forward and back and sideways.

The underside of the "plane" 1 is provided with downwardly extending contact members 30, the lower ends of which are provided with any suitable anti-friction means such as for instance the curved polished surfaces 31 which rest lightly upon the upper smooth surface of the platform 25. These members 30 serve as additional supporting means for the "plane" 1 upon the platform 25 carried by the spindle 21 but do not interfere with the rotary movement of the "plane" on such spindle.

Obviously with this construction, the "plane" is supported entirely on the spindle 21, which being freely pivotal on the spindle 19 requires such spindle 21 to be maintained in balanced vertical position in order for the "plane" to be on an even keel. I have provided means under the control of the operator for maintaining such balance and have also provided means for automatically upsetting such balance coupled with the operating means for maintaining balance whereby the operator may correct the action of such upsetting means.

Supported upon the platform 16 are the bellows 32 and 33 secured at one end to the platform, as by means of the screws or bolts 34 and having their opposite ends connected as by the chains 35 or other suitable flexible connecting means, with the underside of the platform 25. These bellows will be known as the elevator bellows for the reason that as in a regular airplane the operation of the elevators, corresponding to the dummy elevators 7 of my device, move up or down, the airplane tilts up or down, so as the bellows 32 and 33 are extended or contracted, the platform 25 will be rocked on the pivot 20 and thus the "plane" 1 is tilted up or down. Also mounted on the shelf 16 are bellows 36 and 37 similarly secured to the shelf 16 at one end and similarly connected with the platform 25 at their opposite ends. The details of these connections are not shown as they are identical with the connections 35. These bellows 36 and 37 will be identified as the aileron bellows for the reason that if the ailerons of an airplane are moved up or down, the airplane will be tilted to one side or the other, so as the bellows 36 and 37 are expanded or contracted, the platform 25 will be tilted on the pivot 22 to one side or the other depending on the expansion or contraction of the bellows.

Suitably secured as by means of brackets 38, to the bracket member 12 back of the seat or rear side of the cock pit, are the bellows 39 and 40 having one end connected to the brackets 38. The opposite end of the bellows 39 is connected by the cable 41 extending around a pulley 42, supported by bracket 43 upon the side of the "plane" 1 adjacent which the bellows 39 is located, to the side of the platform 25 opposite the pulley 42. Likewise, the free end of the bellows 40 is connected by cable 44 extending around pulley 45 supported on bracket 42 on the same side of the "plane" 1 upon which the bellows 40 is mounted, to the side of the platform 25 opposite the pulley 45. This is shown clearly in Figure 3. Obviously from this construction, if the bellows 39 is contracted, and bellows 40 expanded, a pull will be exerted upon cable 41 resulting in a rotary turning movement in one direction of the "plane" 1 on the upper end 27 of the spindle 21. Likewise, if the bellows 41 be contracted, and the bellows 39 expanded, a pull will be exerted upon cable 44 resulting in turning the "plane" 1 on the spindle 21 in the opposite direction. Of course, the extent of such rotary movement in either direction, as well as the extent of tipping or tilting movements of the "plane," is limited by the size of the bellows producing such movements.

These bellows 39 and 40 will be identified as the rudder bellows and as the rudder in a regular airplane, represented by the dummy rudder 6 in the "plane" 1, is moved from side to side, and the airplane responsive thereto changes its direction, so as the bellows 39 and 40 are expanded or contracted, the "plane" 1 will rotate upon the spindle 21 to change its direction.

Figure 10:
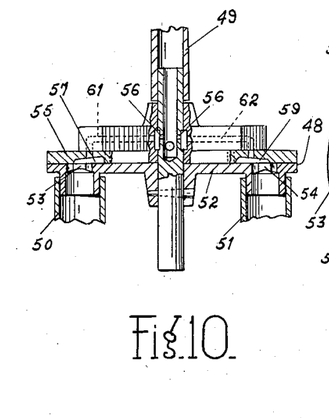
Figure 10 is a detail sectional view illustrating one of the valves used in the operation mechanism.

Disposed within the box 15 is an electric motor or other suitable source of power 46 which when set in operation serves to drive a suction pump indicated generally at 47 and which may be of any desired type or construction. A valve member indicated generally at 48 is provided at each set of bellows above described and communicating with each of the valves 48 as by the flexible pipe 49 is the suction pump 47. The valves 48 are each also connected with their respective set of bellows by means of flexible piping 50 and 51, one connection to each bellows. Inasmuch as all of the valves 48 and the connections 50 and 51 are identical, the detailed structure of one only will be described. This is shown clearly in Figures 10 and 11. The valve 48 comprises a fixed lower plate 52 provided with a pair of openings 53 and 54 communicating with the pipes 50 and 51 respectively.

Rotatable upon the plate 52 and in close air tight connection therewith, is an upper plate 55 provided centrally with ports 56 communicating with the pipe 49. The underside of the upper plate 55 which contacts with the lower plate 52, is provided on each side with a pair of grooves 57 and 58, indicating one pair, and 59 and 60 indicating the other pair. These grooves as indicated clearly in Figure 11 have the inner ends of each pair disposed adjacent each other and at such inner ends the grooves are relatively narrow, the grooves becoming wider at their outer ends. The grooves 57 and 59 communicate at their outer enlarged ends with the ports 56 by means of openings 61 and 62, bored through the body of the upper plate 55. The enlarged ends of the grooves 58 and 60 communicate directly with the atmosphere by means of the ports 63 and 64.

Figure 11:
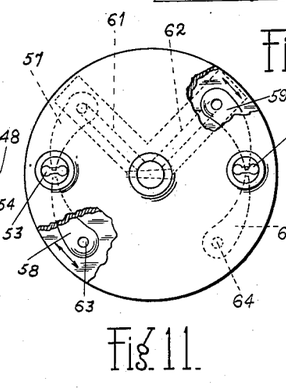
Figure 11 is a detail bottom plan view of the valve partially broken away for clearness of illustration.

Obviously, therefore, with the valve in the position shown in Figure 11, both of the grooves 57 and 59 uncover to a slight extent the openings 53 and 54 in the lower plate 52, thus there is admitted to each of the bellows of whatever particular set the valve is connected with, a slight amount of suction through the pipe 49, ports 56 and openings 61 and 62. With an equal amount of suction on both of the bellows of the particular set, the same will be collapsed the same amount, and therefore, no tilting or tipping action will be produced upon the platform 25. Assuming for the moment that the valve shown in Figures 10 and 11 connects through passages 50 and 51 with the elevator bellows 32 and 33, if now the upper plate 55 of the valve be rotated to the left in Figure 11, the groove 57 will increasingly uncover the opening 53 communicating with the pipe 50 and bellows 32 and simultaneously the groove 60 will with a slight lag, due to the position of the grooves, register with and uncover the opening 54 communicating with bellows 33 through pipe 51. The result of this action is to increase the suction upon the bellows 32 from the pipe 49 through the ports 56 and 61 and simultaneously open the bellows 33 through the pipe 51 to the atmosphere through the port 64. Thus the bellows 32 will be steadily and with increasing speed collapsed by virtue of the suction applied thereto and at the same time, the bellows 33 will be steadily and with increased speed, but with a slight lag in starting, be extended due to the inrush of air through the port 64, groove 60 and pipe 51. This will naturally result in tilting the platform 25 and consequently the "plane" 1 downwardly at its front end. In order to bring the platform 25 and the "plane" 1 back to horizontal position, it will be necessary to reverse this operation and rotate the upper plate 55 of the valve to the right in Figure 11 until the groove 59 registers with the opening 54 and the groove 58 registers with the opening 53 whereby to supply suction through the pipe 51 to the bellows 33 and supply air through the port 63, groove 58 and opening 53 to the bellows 32. Obviously, this would result in contracting the bellows 33 and expanding the bellows 32, thus tilting the platform 25 and the rear end of the "plane" 1 downwardly.

Exactly the same action and operations take place with respect to the bellows 36 and 37, for controlling the sidewise tilting of the platform 25 and "plane" 1 upon operation of the valve 48 connected with such bellows. Likewise when the valve 48 connected with the rudder bellows 39 and 40 is actuated in the manner just described, the resultant expansion or contraction of such bellows serves through the means of the cables 41 and 44, in the manner above explained, to rotate the "plane" 1 upon the upper end of the spindle 21 and the platform 25.

In order that the student or other operator in the "plane" may actuate the valves 48 to control the various movements of the "plane", there is provided in the cock pit a control stick 65 provided with the bifurcated lower end 66 pivoted upon a pintle 67 carried by a block 68 secured fast upon a shaft 69. The lower end of the control stick 65 is connected by means of a suitable link or other operating connection 70 with a bracket 71 secured to the upper plate 55 of the valve 48 connected with the elevator bellows 32 and 33. Obviously, therefore, and as clearly illustrated in Figure 9, movement of the stick 65 on its pivot 67, that is forward or backward, will through the means of the link 70 turn the upper plate 55 of this valve 48 causing the elevator bellows 32 and 33 to operate in the manner above explained, whereby the movement of the "plane" 1 under the control of the stick 65, simulates exactly that of a regular airplane, the elevators of which are operated by the regular control stick.

The fact of the block 68 being connected with the shaft 69, makes it clear that movement of the control stick 65 sidewise, that is to one side or the other, will rotate the shaft 69 in one direction or the other. Secured upon the shaft 69 is a bracket 72 connected by means of link 73 with a bracket 74 secured to the upper plate 55 of the valve 48 controlling the aileron bellows 36 and 37. Thus as the control stick 65 is moved to right or left sideways, the bellows 36 and 37 will control the side tipping movement of the "plane" 1 and platform 25 exactly as does the movement of the ailerons of a regular airplane under the control of the regular stick.

Also suitably pivoted in the cock pit 3 of the "plane" 1 as by the pintle 75 is a foot bar 76 adapted to be rocked on its pivot by the feet of the student or operator and corresponding in position and construction to the regular rudder control bar of a regular airplane. This bar 76 is connected by a link 77 with a bracket 78, secured to the upper plate 55 of the valve 48 controlling the rudder bellows 39 and 40. Thus as the student or operator turns the bar 76, the bellows 39 and 40 will collapse or expand to rotatably turn the "plane" 1 exactly as does the operation of the rudder bar of a regular airplane control the rudder thereof, simulated in this case by the dummy rudder 6.

Thus there is provided under the control of the operator or student, a means for causing and correcting all of the various natural positions which an airplane assumes in flight.

Figure 5:
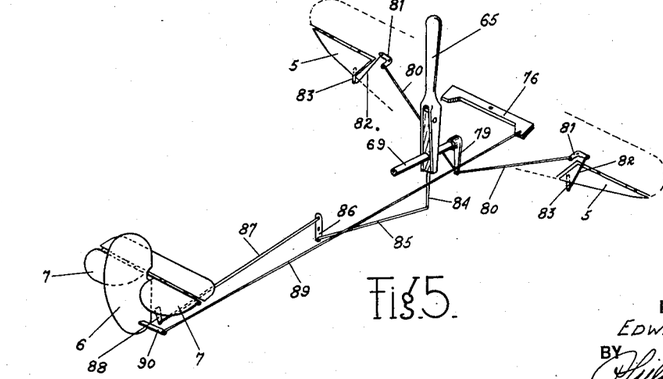
Figure 5 is a diagrammatic perspective illustration of the dummy device representing actual parts of an airplane and showing the connections between such device and the control stick of my device.

In order that the student or operator may in addition to feeling the movements of the "plane" 1 in response to the actuation of the control means just described, actually see the corresponding parts operate in accordance with such control, I have provided operating means for the dummy ailerons 5, rudder 6, and elevators 7. This means is illustrated clearly in Figure 5 diagrammatically. The forward end of the shaft 69 is provided with a downward extension 79 from which extend outwardly the links 80 connected at their outer ends with one end of bell cranks 81, the opposite ends of which are connected by links 82 with downwardly extending pins 83 carried by the dummy ailerons 5. Thus rotation of the shaft 69 by movement of the control stick 65 serves to actually operate the ailerons 5 in accordance with the operation of the stick, and in accordance with the movement of the "plane" 1 by the bellows 36 and 37.

Extending downwardly below the end of the control stick 65 is a pin 84 having its lower end connected by means of link 85 to one end of a pivoted bracket 86, the opposite end of which is connected by link 87 to a pin 88 connected with the elevators 7, whereby upon forward or backward movement of the stick 65, the dummy elevators 7 will be moved up or down in accordance with the stick control and in accordance with the actuation of the elevator bellows 32 and 33.

Likewise, the rudder bar 76 has connected thereto at one end a link 89, the opposite end of which is connected to a pin 90 carried by the dummy rudder 6, whereby when the rudder control bar is operated, the rudder 6 will move in accordance with such operation, and in accordance with the movement of the "plane" 1 by virtue of the rudder bellows 38 and 40.

Thus the student or operator is able to see the actual operation of these parts in simulation of corresponding real parts of an airplane, under his own control and in accordance with the movements of the "plane" 1.

In order that the movements of the "plane" 1 may be automatically brought about so that the student or operator will be put to the necessity of correcting such movements with the control stick 65, and the parts operated thereby, in order to bring and maintain the "plane" 1 on an even keel, I have provided a means for influencing the various bellows through their valves 48, independent of the control stick 65. This means is illustrated clearly in Figures 9 and 12 and includes a supporting bracket 91 supporting a shaft 92 upon which is fixed a disk 93 provided with a series of ports or openings 94 communicating through the medium of the pipes 95 with the pipes 50 and 51. There is an opening 94 and a communicating pipe 95 connected with each of the pipes 50 and 51.

Figure 9:
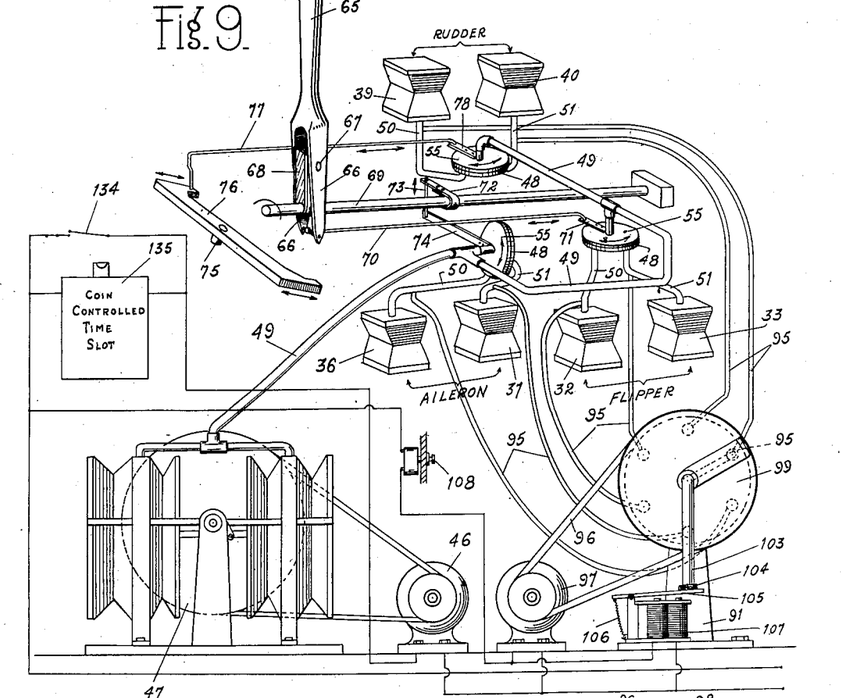
Figure 9 is a diagrammatic perspective illustration of the fluid operating means and control of my invention.
Figure 12:
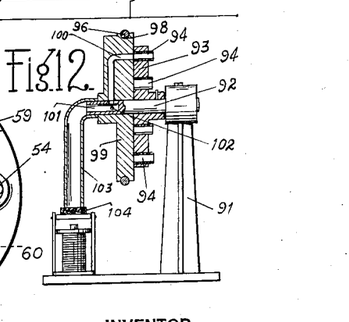
Figure 12 is a detail cross sectional view of the distributor or "rough air" portion of the operating means.

Rotatable upon the shaft 92 as by means of the belt 96 cooperating with the motor 97 and a pulley groove 98, is a distributor disk 99 fitting tightly against the face of the disk 93 and adapted to rotate with respect thereto. This distributor disk 99 is provided with a port 100 adapted to communicate at one end with one of the ports 94 in the disk 93 and as the distributor disk 99 is rotated, to successively register with such ports 94. The rotation of the distributor disk 99 is preferably very slow so as to leave the port 100 in communication with each of the ports 94 an appreciable amount of time as the disk 99 moves with respect to the disk 93. The opposite end of the port 100 in the distributor disk communicates with the hollow end 101 of the shaft 92 by means of the openings 102 in such hollow shaft, said shaft having one opening for each of the ports 94. This hollow end 101 of the shaft 92 communicates with the atmosphere through a short pipe 103, such communication being normally closed, however, by means of a valve or plug 104 carried upon one end of a pivoted arm 105 provided at its opposite end with a coil spring 106 serving to normally hold the closure 104 against the open end of the pipe 103. This arm 105 serves as an armature for an electromagnet 107, said magnet being located in the circuit to the motor 97 and said circuit being under the control of the switch member 108 located on the dash 10 of the cock pit. Obviously, therefore, when the switch 108 is closed, the circuit to the motor 97 and to the magnet 107 will be closed, thus starting the motor and consequently the rotation of the distributor disk 99, and also energizing the magnet 107, thus drawing the closure plug or valve 104 out of contact with the end of the pipe 103, leaving it freely open to the atmosphere.

Assuming now that this operation has just taken place, the motor 46 and pump 47 having previously been started, the distributor disk 99 will rotate slowly. As it reaches the position shown in Figure 9, for instance, that is with the port 100 communicating with the port 94 and pipe 95 and through such pipe with the pipe 51 of the bellows 39, there will obviously be an inrush of air from the pipe 103 through the distributor disk, port 94 and pipe 95 to the bellows 39, thus expanding such bellows and causing rotation of the "plane" 1 attendant upon such expansion. This same action occurs to each of the bellows as the distributor disk rotates and comes into communication with the pipes 95 leading to each bellows.

When the "plane" 1 moves in response to such action, the student or operator must necessarily operate the stick 65 and consequently the appropriate valve 48, in such a manner as to offset such inrush of air to a particular bellows by offsetting the expansion of the particular bellows affected with the expansion of the other bellows of that set, by admitting air thereto through the port 64, groove 60 and opening 54, or the port 63, groove 58 and opening 53, as the case may be. Simultaneously, of course, a suction action is presented to the bellows affected by the air through the pipe 95, tending to counteract the effect of such air.

The disposition of the ports 94 and pipe 95 with respect to the distributor disk 99 may be such as to operate first one of the rudder bellows, then one of the aileron bellows, and so on there being obviously a wide choice in the sequence of the bellows operation by the distributor disk.

In order that the student or operator may be visually apprised of the fact of whether or not the "plane" 1 is being maintained on a relatively even keel, and if not, in what direction the error in position lies, I have provided a novel indicator operative to show at a glance the position of the "plane" 1. Referring now to Figures 1 and 6, it will be noted that there is supported upon the box 15 as by means of the brace rod 109, a bracket 110 extending outwardly and forwardly of the "plane" 1. On the outer end of this bracket 110 is an upwardly extending supporting rod 111 on the upper end of which is positioned a ring 112 which is located in exact center alignment with the longitudinal axis of the "plane" 1 and the center of which ring is at the proper height so that if the "plane" 1 is on an even keel, a small sighting device 113 located on the forward end or nose of the "plane" 1, is in visual alignment with such ring center and the eye of the student or operator. The student or operator can, therefore, by watching the sight 113 and the ring 112, observe whether or not the "plane" is in proper position for straight flying. In the preferred form of my invention, this sighting device 113 is in the form of a small electric lamp, provided with a suitable source of current, and adapted to be illuminated each time that the "plane" moves to a position out of normal or even keel position.

Provided upon the shelf 16 is a fixed upstanding guide member 114 provided with a pair of fixed spaced contacts 115. Slidable within the guide member 114 is a slide 116 provided with a contact finger 117 adapted upon movement upward to engage with the upper contact 115 and upon movement downward with the lower contact 115. All three of the contacts 115 and 117 are in the circuit to the lamp 113. The slide 116 is normally urged downwardly by means of a coil spring 118. The slide 116 is connected by means of a suitable chain or other flexible connection 119 with the platform 25. In the normal position of the platform 25, that is with the "plane" 1 on an even keel, the position of the spring contact 117 is between the stationary contacts 115 and consequently the circuit to the lamp is broken. If, however, the platform 25 and "plane" 1 is tilted sidewise to the left in Figure 6, the spring 118 pulls the slide 116 downwardly, and if such movement is sufficient to bring the lamp 113 out of the ring 112, such movement will also be sufficient to bring the contact 117 into engagement with the lower contact 115, thus establishing the current to the lamp 113 and lighting the same. If on the other hand, the movement of the platform 25, and "plane" 1 is in the opposite direction, the slide 116 will be pulled upwardly and the contact 117 engage the upper contact 115, thus showing that the "plane" 1 has tilted too far in the opposite direction by again lighting the lamp 113.

A second guide member 114a is also provided on the shelf 16 and is provided with parts identical with those just described in connection with the contact devices for lighting the lamp upon tilting the "plane" 1 and platform 25 from one side to the other. This device 114a however, is so positioned as to be responsive to tilting of the "plane" 1 and platform 25 upwardly or downwardly, and operates in exactly the same manner as just described, that is if the nose of the "plane" tilts upwardly to bring the lamp 113 out of alignment with the ring 112, such lamp will be lighted, as will it also if the nose of the "plane" is tilted downwardly to a similar extent.

Another identical contact device 114b similar in all respects to the device 114, is carried by the underside of the platform 25, and the slide 116a thereof is connected by the chain 119a with the lower end of an arm 120 secured to and depending from the body of the "plane" 1. The operation of this device is identical with that previously described, and serves to illuminate the lamp 113 if and when the "plane" 1 rotates to an extent sufficient to bring such lamp out of alignment with the ring 112. Figure 7 shows in detail the construction of the contact device 114, and the contact device 114a and 114b are identical therewith.

By this means a flash of the lamp 113 immediately indicates to the student or operator that the "plane" 1 is out of even keel position and the position of the lighted lamp indicates to him the exact position of the "plane". So long as the lamp is not illuminated, he knows that it is in such proper position.

As a means for making a record or check of the number of errors which a student or operator makes by allowing the "plane" to get out of proper position, that is out of even keel, I have provided a recording device which operates automatically to count and register each error. This is indicated in Figure 6 and comprises a drum 121 rotatable upon a shaft 122, the periphery of the drum being adapted to receive numbers 123, one of which is visible at a time through an opening 124 in the dash board 10. Provided upon the shaft 122 is a ratchet 125 engageable with the teeth of which is a pawl 126 which comprises the armature of a solenoid 127, which when energized serves to draw the pawl 126 downwardly and thus rotate the drum 121 a distance of one tooth to bring the next number into view. A coil spring 128 encircles the shaft 122 and normally tends to urge the drum 121 to zero position. A catch pawl 129 carried upon the bracket 130 serves to hold the ratchet 126 in its adjusted position when actuated by the pawl 126. A flat leaf spring 131 normally presses the pawl 126 into engagement with the ratchet and connected to the pawl 126 is a finger piece 132 and by means of which the pawl may be moved out of engagement with the ratchet. The finger piece 132 is connected by means of the chain or other device 133 with the lock pawl 129, whereby when the finger piece 132 is pulled outwardly the ratchet 125 and drum 121 is free to return to zero position under the influence of the spring 128.

The solenoid 127 is connected in the circuits of each of the contact members 114, 114a and 114b, whereby upon closing of any of the contacts 115 by the spring finger 117 thereof, not only will the lamp 113 be illuminated as before explained, but the solenoid 127 will be energized and the drum 121 will be moved one tooth and thus the number of errors made by the student or operator will be registered through the opening 124 in the dash board.

The circuit to the pump motor 46 whereby to set the device in operation, is controlled by a manually operable switch 134 or by means of a suitable coin controlled switch operable by the coin device indicated generally at 135. Obviously this device holds great possibilities as an entertainment apparatus, and the use of the coin box control 135 enables the operation of the device for profit as an entertainer.

It will be understood that although my invention has been illustrated and described in connection with operating means using air as the activating fluid, the same is readily adaptable to the use of other fluids, as well, such as oil or water, the only changes necessary being the provision of connections from the atmosphere outlets as herein described, back to the reservoir or container provided for such fluid.

Of course, changes may be made in details of construction and arrangement of parts without departing from the spirit and scope of my invention. I do not limit myself, therefore, to the exact form herein shown and described, other than by the appended claims.

I claim:

1. An apparatus for teaching the art of aeroplaning, comprising a stationary support, a frame and seat pivotally mounted thereon for tilting with respect to said support, and fluid actuated means operable from said seat for controlling the position of said frame and seat, on the support.

2. An apparatus for teaching the art of aeroplaning, comprising a stationary support, a frame and seat pivotally and rotatably mounted thereon for tilting and rotary movement with respect to said support and fluid actuated means operable from said seat for controlling the position of said frame and seat on the support.

3. An apparatus for teaching the art of aeroplaning, comprising a stationary support, a frame and a seat pivotally and rotatably mounted thereon, means for changing the position of said frame and seat and fluid actuated means operable from said seat for offsetting such position changing whereby to maintain the frame and seat on an even keel.

4. An apparatus for teaching the art of aeroplaning, comprising a stationary support, a frame and seat pivotally and rotatably mounted thereon, fluid actuated means for changing the position of said frame and seat and fluid actuated means for offsetting such position changing whereby to maintain the frame and seat on an even keel.

5. An apparatus for teaching the art of aeroplaning, comprising a frame and seat, fluid actuated means for causing through said frame and seat, the sensations of unstable equilibrium to an operator in said seat by movement thereof, and means controllable by the operator in said seat for changing the position of said apparatus.

6. An apparatus for teaching the art of aeroplaning, comprising a frame and seat, fluid actuated means for causing through said frame and seat, the sensations of unstable equilbrium to an operator in said seat by movement thereof, and means controllable by the operator in said seat for changing the position of said apparatus, said controlling means comprising fluid actuated devices for offsetting the means for causing said unstable equilibrium.

7. An apparatus for teaching the art of aeroplaning comprising a frame and seat in simulation of an airplane, and fluid actuated means operable from said seat for disturbing and restoring the horizontal equilibrium thereof.

8. An apparatus for teaching the art of aeroplaning comprising a frame and seat in simulation of an aeroplane, means for disturbing the equilibrium of said seat and frame, and fluid actuated means controllable from the seat for offsetting and correcting the action of said disturbing means.

9. An apparatus for teaching the art of aeroplaning comprising a frame and seat in simultation of an airplane, means for automatically disturbing the equilibrium of said seat and frame, and fluid actuated means controllable from the seat for offsetting and correcting the action of said automatic means.

10. An apparatus for teaching the art of aeroplaning comprising a frame and seat in simulation of an airplane, fluid actuated means for automatically disturbing the equilibrium of said seat and frame, and fluid actuated means controllable from the seat for offsetting and correcting the action of said automatic means.

11. An apparatus for teaching the art of aeroplaning comprising a frame and seat in simulation of an airplane, fluid actuated means for automatically disturbing the equilibrium of said seat and frame, and fluid actuated means controllable from the seat for offsetting and correcting the action of said automatic means, both of said fluid actuated means having a common source.

12. An apparatus for teaching the art of aeroplaning comprising a frame and seat in simulation of an airplane, fluid actuated means for automatically disturbing the equilibrium of said seat and frame, and fluid actuated means controllable from the seat for offsetting and correcting the action of said automatic means, said fluid actuated means including a plurality of collapsible and extensible means cooperating with said frame and having communication with a source of suction and the atmosphere.

13. An apparatus for teaching the art of aeroplaning comprising a frame and seat in simulation of an airplane, fluid actuated means for automatically disturbing the equilibrium of said seat and frame, and fluid actuated means controllable from the seat for offsetting and correcting the action of said automatic means, said fluid actuated means including a plurality of collapsible and extensible means cooperating with said frame and having communication with a source of suction and the atmosphere, and valves in said communication lines, adapted to be actuated from said seat.

14. An apparatus for teaching the art of aeroplaning comprising a frame and seat in simulation of an airplane, fluid actuated means controllable from said seat for disturbing and restoring the equilibrium thereof, indicating means including a fixed member and a member movable with said frame and seat for indicating the position of said frame and seat, said movable member comprising an electric lamp, and means on said seat and frame operative to illuminate said lamp in certain positions of said seat and frame with respect to said fixed member.

15. An apparatus for teaching the art of aeroplaning comprising a frame and seat in simulation of an airplane, fluid actuated means controllable from said seat for disturbing and restoring the equilibrium thereof, and indicating means including a fixed member and a member movable with said frame and seat for indicating the position of said frame and seat, said movable member comprising an electric lamp, and contact devices operable upon movement of said frame and seat out of predetermined position in any direction, to close a circuit to said lamp, whereby the same is lighted to indicate the out-of-predetermined position.

16. An apparatus for teaching the art of aeroplaning comprising a frame and seat in simulation of an airplane, fluid actuated means for automatically disturbing the equilibrium of said frame and seat, fluid actuated means operable from the seat for upsetting and correcting the action of said first named means, and visual means for indicating the position of said frame and seat, said indicating means comprising an electric lamp carried by said frame, and contact devices operable upon movement of said frame and seat out of a predetermined position in any direction to illuminate said lamp.

17. An apparatus for teaching the art of aeroplaning comprising a frame and seat in simulation of an aeroplane, pivot supporting means therefor whereby the equilibrium of said frame and seat is adapted to be disturbed, fluid actuated means controllable from the seat for restoring the equilibrium thereof, and means operable by the movements of said frame and seat out of a single predetermined position for recording each of such movements.

18. An apparatus for teaching the art of aeroplaning comprising a frame and seat in simulation of an airplane, fluid actuated means controllable from said seat for disturbing and restoring the equilibrium thereof, and means operable by the movement of said frame and seat out of a predetermined position for recording each of such movements.

19. An apparatus for teaching the art of aeroplaning comprising a frame and seat in simulation of an airplane, fluid actuated means controllable from said seat for disturbing and restoring the equilibrium thereof, and means operable by the movement of said frame and seat out of a predetermined position for recording each of such movements, said means including a counter visible from said seat.

20. An apparatus for teaching the art of aeroplaning comprising a frame and seat in simulation of an airplane, fluid actuated means controllable from said seat for disturbing and restoring the equilibrium thereof, and means operable by the movement of said frame and seat out of a predetermined position for recording each of such movements, said means including a counter visible from said seat, and contact devices operable by the movements of said frame and seat and having electrical connections with said counter.

21. An apparatus for teaching the art of aeroplaning comprising a frame and seat in simulation of an airplane, fluid actuated means controllable from said seat for disturbing and restoring the equilibrium thereof, and means operable by the movement of said frame and seat out of a predetermined position for recording each of such movements, said means including a counter visible from said seat, and contact devices operable by the movements of said frame and seat and having electrical connections with said counter, and an electric lamp on said frame and included in the circuits of said contact devices.

22. An apparatus for teaching the art of aeroplaning comprising a frame and seat in simulation of an aeroplane, pivot supporting means therefor whereby the equilibrium of said frame and seat is adapted to be disturbed, fluid actuated means for restoring the equilibrium thereof, a control stick in said frame for controlling said fluid actuated means, and instruments on said frame, visible from the seat for indicating the position of said frame and seat.

23. An apparatus for teaching the art of aeroplaning comprising a frame and seat in simulation of an airplane, fluid actuated means for disturbing and restoring the equilibrium thereof, a control stick in said frame for controlling said fluid actuated means, and instruments on said frame, visible from the seat, for indicating the position of said frame and seat.

24. An apparatus for teaching the art of aeroplaning comprising a frame and seat and dummy aeroplane controlling members, pivot supporting means therefor, whereby the equilibrium of said frame and seat is adapted to be disturbed, fluid actuated means for restoring the equilibrium thereof, a control stick in said frame for controlling said fluid actuated means, and operative connections between said stick and said dummy members whereby the latter operate in accordance with the operation of said stick and said fluid actuated means.

25. An apparatus for teaching the art of aeroplaning comprising a frame and seat and dummy airplane controlling members, fluid actuated means for disturbing and restoring the equilibrium of said frame and seat, a control stick in said frame for controlling said fluid actuated means, and operative connections between said stick and said dummy members whereby the latter operate in accordance with the operation of said stick and said fluid actuated means.

In testimony whereof, I affix my signature.

EDWIN A. LINK, Jr.